United States Patent [19]
Faulkner

[11] 3,961,773
[45] June 8, 1976

[54] TRACTION DEVICE
[76] Inventor: Max L. Faulkner, 2000 W. 92nd Ave., Space 25, Denver, Colo. 80221
[22] Filed: July 14, 1975
[21] Appl. No.: 595,844

[52] U.S. Cl. .................................................. 256/1
[51] Int. Cl.² ........................................ F04H 17/00
[58] Field of Search ...................... 256/1; 273/1 R; 34/5 GP

[56] References Cited
UNITED STATES PATENTS
2,346,713   4/1944   Walker .................................. 256/1
2,466,707   4/1949   Janney .................................. 256/1

OTHER PUBLICATIONS
Modern Plastic, p. 65, Aug. 1939.

*Primary Examiner*—Paul R. Gilliam

[57] ABSTRACT

A disposable device adapted to be used in relatively large numbers in place of using tire chains on icy roads by being partially inserted into the outer surface of automotive tires. The device is a polymeric solid body having four like solid interconnected and integral legs having one end in common, with all other ends being pointed. The legs extend outward in four different directions and are separated by 120° with respect to each other.

4 Claims, 4 Drawing Figures

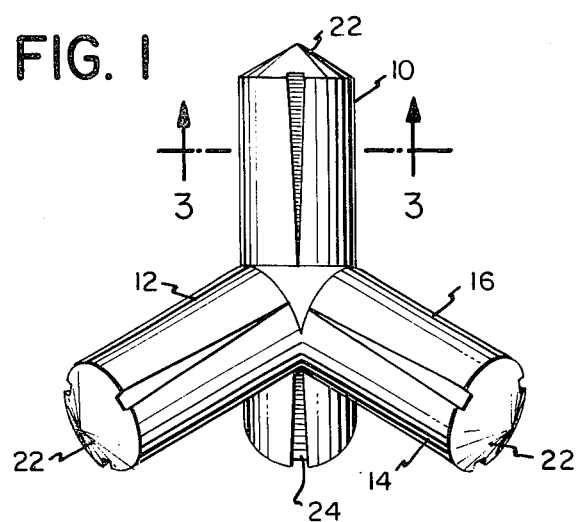
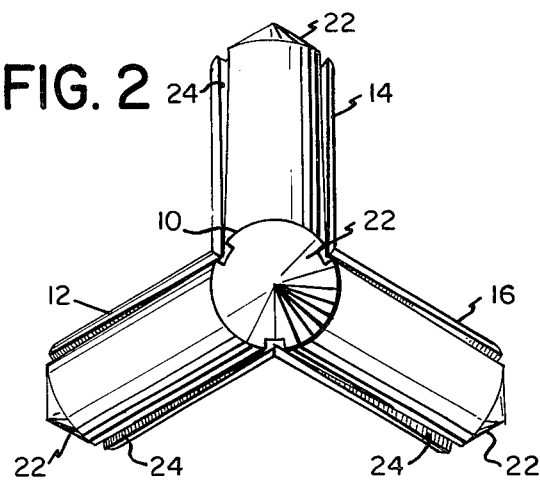
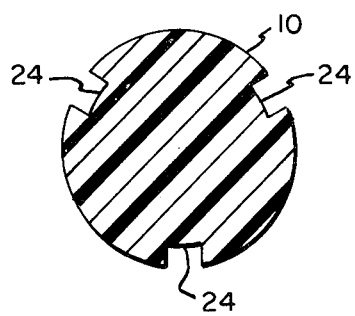
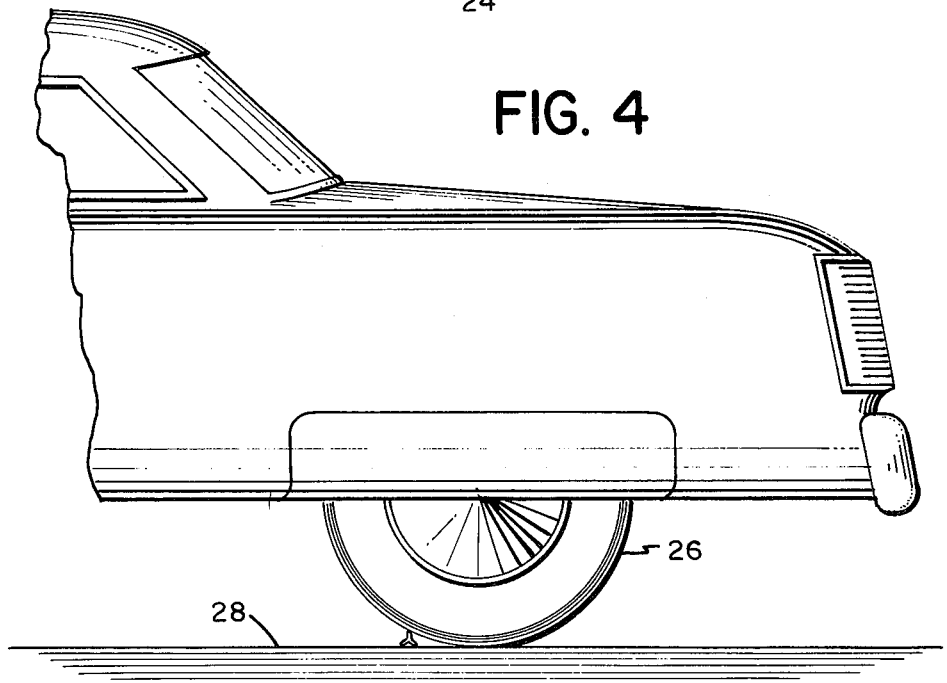

TRACTION DEVICE

THE PRIOR ART

U.S. Pat. No. 2,346,713 teaches a caltrop for deflating tires by puncturing them and letting the air out. The caltrop employs four hollow arms with oblique cut off pointed ends having central openings whereby air can be passed through.

BACKGROUND OF THE INVENTION

This invention is directed towards means for eliminating the use of tire chains on tires of automobiles when the automobiles are to traverse icy roads. The means takes the form of a plurality of small disposable polymeric (plastic) traction devices which are partially imbedded in the periphery of the tires and which stick out therefrom and penetrate ice on roads and the like to provide enhanced traction.

These devices bear certain resemblances to the caltrop structures taught in U.S. Pat. No. 2,346,713 but exhibit very significant differences since applicant's invention is directed toward continued use of inflated tires without deflating same.

SUMMARY OF THE INVENTION

In accordance with the invention, a plurality of disposable polymeric (plastic) devices are employed. Each device takes the form of a solid body having four like solid legs having one end in common. The opposite ends of all legs are pointed. The legs extend outward in four different directions and are separated by 120° with respect to each other.

In use a plurality of the devices are disposed on the road underneath the tires. As the tires rotate one leg of each device becomes imbedded in the tire while the other legs stick out and will penetrate ice to provide enhanced traction as indicated. The devices will wear out rapidly in use. Some of the devices may be dislodged from the wheel and thrown outward, but these devices can cause no injury because of small size and flexible structure.

In order to provide suitable penetrating action and adherence to the tire, each device has a plurality of longitudinally extending equidistantaly spaced grooves formed into the exterior surface of each leg. Best results are obtained when these grooves taper gradually in width from a minimum at the common end to a maximum at each pointed end.

BRIEF DESCRIPTION OF THE DRAWINGS

FIG. 1 is a front view of a device in accordance with the invention;

FIG. 2 is a top view of the device.

FIG. 3 is a cross sectional view taken along line 3—3 in FIG. 1.

FIG. 4 shows the invention in use.

DETAILED DESCRIPTION OF PREFERRED EMBODIMENTS

Referring now to FIGS. 1–4, each device is constructed of polymeric (plastic) material and takes the form of four interconnected integral like solid legs 10, 12, 14 and 16 having one end in common and opposite pointed ends 22. These ends can but need not be conically shaped. The legs extend outward in four different directions and are spaced apart by 120°. Each three adjacent pointed ends define a plane whereby four different intersecting planes are formed and define a regular tetrahedron with each pointed end defining a separate vertex thereof.

Each leg has three or more equidistantly disposed longitudinally extending grooves 24 formed in the outer surface. These grooves can be of uniform width but best results are obtained when the width of the grooves varies smoothly and continuously from a minimum at the common end to a maximum at each pointed end.

Each leg in cross section defines a circle of like diameter. Typically, this circle can have a diameter of 0.125 inches. Each leg typically is 0.140 inches long. The altitude of each point is typically 0.340 inches high. Each groove has a typical depth of 0.025 inches. Minimum and maximum groove widths typically are 0.020 inches and 0.040 inches respectively.

These devices, which I call "Ice Burrs", are disposed on an icy road 28 underneath tires 26 whereby tire rotation picks up the devices and places same in use.

The purpose of the Ice Burr is to give added traction to a tire when traveling upon an icy roadway or surface. The Ice Burr will function the same as small pieces of gravel strewn upon the icy roadway, which is a common practice to prevent slipping, except, the Ice Burr will become embedded in the tread of the tire and give added traction for several miles; whereas, gravel will fly off the tires with just a few turns of the wheels.

The Ice Burr is different from the tire stud, as the stud is placed in the tire permanently and is made of metal, therefore it will cause damage to the surface of the roadway.

The Ice Burr is designed to be in the tire for a temporary length of time and will become dislodged or wear out before causing damage to the surface of the roadway.

ADVANTAGES

1. Inexpensive — Ice Burrs can be formed in a mold, without any machine work, at a very minimal cost.

2. Ice Burrs can be applied to the tire by simply pouring them on the ground and driving over them.

3. When the perpendicular prong is embedded in the tire tread, the other three prongs will function as a three-pointed claw.

4. Many times it is necessary to have extra traction for a short distance; such as, backing away from an icy curb, or starting after having had to stop on an icy grade, etc.

5. Ice Burrs may be applied to the front tires to give temporary added traction for steering and also when using brakes on an icy road.

6. Ice Burrs may be applied to tires on trailers; such as, small luggage trailers, camper trailers, mobile homes, ets. to prevent slipping sideways and jack-knifing on an icy road, and also to assist when braking.

7. Many times a driver has to stop on an icy grade due to the roadway's being blocked with other vehicles that are stalled. If stopped going up grade, then simply put some Ice Burrs behind all tires, both front and rear, and roll back on them. If stopped going down grade, place some Ice Burrs in front of all tires and roll onto them. This will hold the vehicle on the roadway while having to park, and will assist in starting when the road is once again open.

8. The Ice Burr will also give added traction on a wet oily roadway in warm weather.

9. The Ice Burr will not damage the surface of the roadway, as the surface of a roadway has more resistance than the rubber in the tread of the tire; therefore, if the driver spins his wheels, the Ice Burr will pull out before doing damage to the surface of the roadway. If the driver does not spin his wheels, the Ice Burr will remain embedded in the tread of the tire for an indefinite length of time.

10. Ice Burrs are made of polymeric (Plastic) material with a very low density and are resilient, therefore, if these devices should come out of the tire before these devices wear out, the specific gravity is so low that these devices will not fly very far. Since these devices are resilient, if these devices should strike anything, these devices will bounce off without causing any damage.

While this invention has been described with particular reference to the drawings, such is not to be considered as limiting its actual scope.

I claim:

1. A disposable device adapted to be used in relatively large numbers with automobile tires in place of using tire chains on icy roads, said device comprising a polymeric solid body having four like solid legs which are interconnected and integral, all of the legs having one end in common, the opposite ends of all legs being pointed, said legs extending outward in four different directions and being separated by 120° with respect to each other, each three adjacent pointed ends defining a plane whereby four intersecting planes defining a regular tetrahedron are formed, each pointed end defining a different vertex thereof, each leg having a plurality of equidistantly spaced longitudinally extending grooves in the outer surface.

2. The device of claim 1 wherein said grooves continuously increase in width from a minimum at the common end to a maximum at the opposite end.

3. The device of claim 2 wherein said legs are circular cylinders with conically shaped points.

4. The device of claim 2 wherein said legs are circular cylinders with pointed ends.

* * * * *